Figure 1:
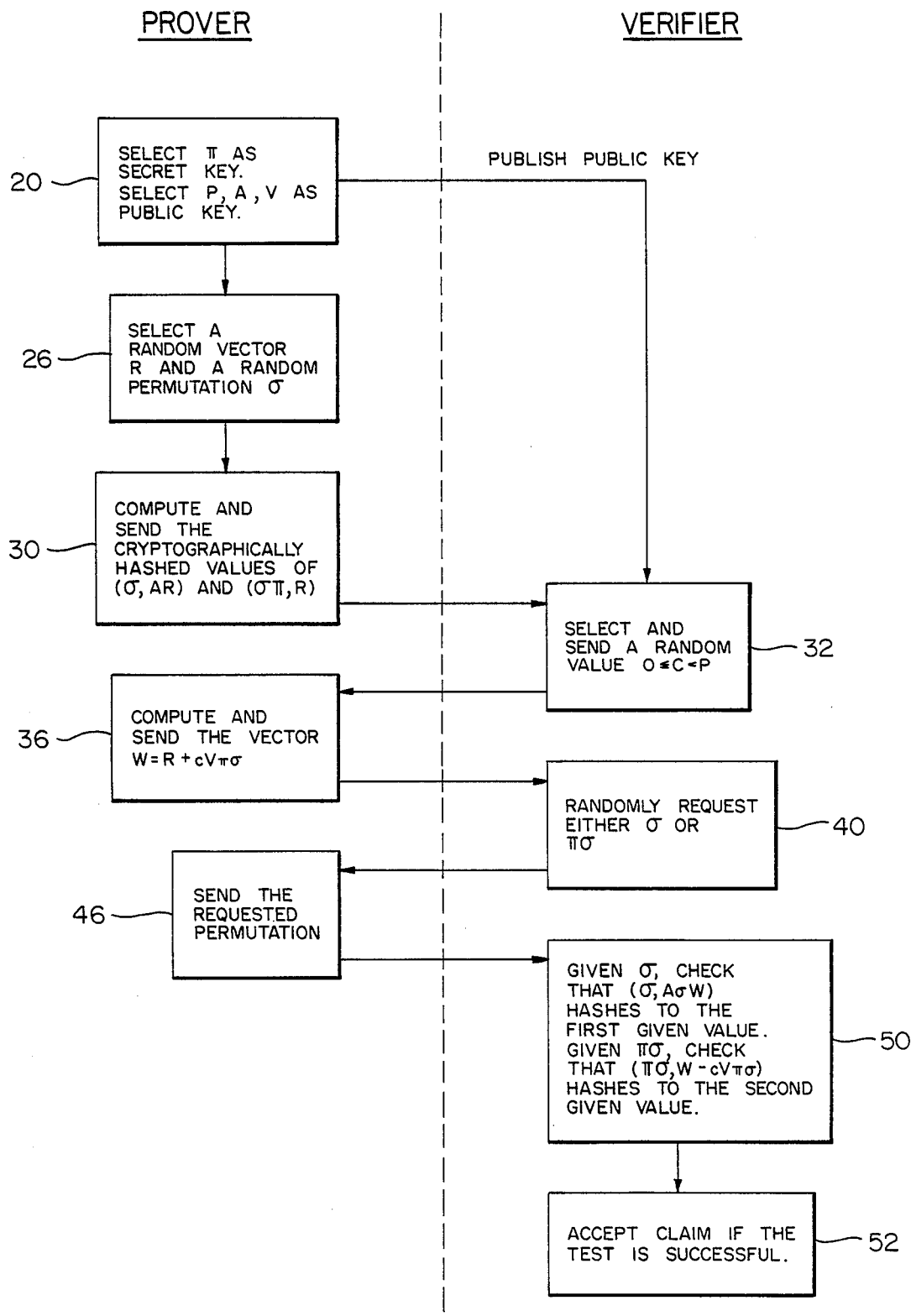

United States Patent [19]

Shamir

[11] Patent Number: 4,932,056
[45] Date of Patent: Jun. 5, 1990

[54] METHOD AND APPARATUS FOR USER IDENTIFICATION BASED ON PERMUTED KERNELS

[75] Inventor: Adi Shamir, Rehovot, Israel

[73] Assignee: Yeda Research and Development Company Limited, Rehovot, Israel

[21] Appl. No.: 324,508

[22] Filed: Mar. 16, 1989

[51] Int. Cl.$^5$ ............................................. H04L 9/00
[52] U.S. Cl. ...................................... 380/23; 380/25; 380/28; 380/30
[58] Field of Search ................................... 380/23–25, 380/30, 28

[56] References Cited

U.S. PATENT DOCUMENTS

| | | | |
|---|---|---|---|
| 4,514,592 | 4/1985 | Miyaguchi | 380/28 |
| 4,748,668 | 5/1988 | Shamir et al. | 380/30 |
| 4,759,063 | 7/1988 | Chaum | 380/30 |
| 4,759,064 | 7/1988 | Chaum | 380/30 |
| 4,799,061 | 1/1989 | Abraham et al. | 380/23 |
| 4,799,258 | 1/1989 | Davies | 380/23 |

Primary Examiner—Salvatore Cangialosi
Attorney, Agent, or Firm—Fleit, Jacobson, Cohn, Price, Holman & Stern

[57] ABSTRACT

A method and apparatus for identification of a prover to a verifier in which the prover demonstrates his knowledge of a secret permutation $\pi$ such that $V_\pi \in K(A)$ for publicly known A and V where all the arithmetic operations are carried out modulo p. The actual proof does not reveal any knowledge of $\pi$, and thus it cannot be misused by dishonest verifiers or eavesdroppers to later misrepresent themselves as the prover. The new scheme is much faster than the RSA and Fiat-Shamir identification schemes.

26 Claims, 1 Drawing Sheet

METHOD AND APPARATUS FOR USER IDENTIFICATION BASED ON PERMUTED KERNELS

I. BACKGROUND OF THE INVENTION (A) Field of the Invention

The present invention relates to a novel method and apparatus for user identification and access control based on permuted kernels. The scheme is unrelated to encryption and secrecy.

(B) Prior Art

In 1985 Goldwasser, Micali and Rackoff proposed a new type of interactive proof system which reveals no knowledge whatsoever about the assertion except its validity. The practical significance of these proofs was demonstrated in 1986 by Fiat and Shamir, who showed how to use zero knowledge proofs to establish user identities and to digitally sign messages, see U.S. Pat. No. 4,748,668. The particular proof system proposed by Fiat and Shamir was based on the difficulty of extracting square roots modulo composite numbers, and it was much faster and at least as secure as the known RSA scheme (see U.S. Pat. No. 4,405,829).

II. SUMMARY OF THE INVENTION

According to the present invention, a method and apparatus for performing a new type of zero knowledge identification scheme are disclosed. Unlike the RSA and Fiat-Shamir schemes which manipulate huge (512-bit) numbers, the new scheme uses only small (8-bit) numbers. The invention can thus be implemented on smart cards with severely limited RAM, ROM and processing power, and is much faster than the prior art. The security of the new scheme of the present invention depends on an NP-complete algebraic problem rather than on factoring, and thus it widens the basis of public key cryptography, which otherwise may become dangerously dependent on the difficulty of a single problem.

Throughout the following description of the invention, upper case letters are used to denote vectors and matrices, and lower case letters are used to denote values. Greek letters denote permutations over $\{1, \ldots, n\}$, and their effect $V_\pi$ on n-vectors $V$ is defined as the vector $W$ such that $w_j = v_{\pi(j)}$ for $1 \leq j \leq n$. The effect of permutations on matrices is defined as the column permutation $A_\pi = [a_{i\pi(j)}]$ so that for any matrix $A$ and vector $V$, $A_\pi V_\pi = [\Sigma_{j=1}^{n} a_{i\pi(j)} v_{\pi(j)}] = [\Sigma_{j=1}^{n} a_{ij} v_j] = AV$. Permutations are composed as functions, and thus $V_{\pi\sigma}$ is defined as the vector $W$ such that $W_j = v_{\pi(\sigma(j))}$ for $1 \leq j \leq n$. All the arithmetic operations are carried out modulo p, where p is a small number, preferably but not necessarily a prime. The kernel $K(A)$ of a rectangular m x n matrix $A$ is defined as the set of n-vectors $W$ such that $AW = 0 \pmod{p}$, where 0 is the m-vector of zeroes. From the foregoing, one can easily see that $K(A)$ is a linear subspace of $Z_p^m$ and that $K(A_\sigma) = (K(A))_\sigma$.

The permuted kernel problem (PKP) that is utilized in the method and apparatus of the present invention may be expressed in the following way.

Given: a m x n matrix $A$, a n-vector $V$, and a number p;

Find: a permutation $\pi$ such that $V_\pi \in K(A)$.

The related problems of finding some, all, or randomly chosen vectors in $K(A)$ can be solved by straightforward techniques in linear algebra. The problem of finding good approximations in $K(A)$ to a given vector $V$ (and in particular small non-zero vectors in $K(A)$) can be solved by more complicated (but polynomial) lattice reduction techniques. What makes the permuted kernel problem difficult is that one is forced to choose a kernel vector with a particular set of entries. In fact, it is easy to see that the problem is NP-complete even for m=1 and $V = (+1, +1, \ldots, +1, -1, -1, \ldots, -1)$ since this is just the partition problem for the weights in A. A slightly more complicated reduction from the problem of 3-partition as noted by Garey and Johnson shows that the PKP is NP-complete in the strong sense (i.e., its difficulty grows exponentially in p rather than in log(p), under appropriate assumptions). This makes it possible to use small numbers in the proposed identification scheme, which greatly enhances its simplicity and speed.

The method and apparatus of the present invention implement the permuted kernel problem in an identification scheme in the following manner. Users agree on a universal matrix A and a number p, and then each user chooses a random permutation $\pi$ (which serves as his secret key) and a random vector V such that $V_{90} \in K(A)$ (which serves as his public key). Users can now establish their identity by proving their knowledge of the secret permutation $\pi$. By using zero knowledge proofs, provers can guarantee that eavesdroppers and dishonest verifiers will not learn anything about $\pi$ which will later enable them to misrepresent themselves as the prover to others.

The existence of zero knowledge proofs for any problem in NP was demonstrated by Goldreich, Micali and Wigderson (1986), but their proofs are totally impractical since they require thousands of interactions between the prover and the verifier. Blum (in an unpublished manuscript) developed simpler proofs which require fewer interactions, but each interaction requires tens of thousands of communicated bits (to enable the prover to commit himself to thousands of independent bits). The Fiat-Shamir proofs (which improve earlier unpublished proofs of quadratic residuosity by Fischer and Micali) require few interactions and a small number of communicated bits, but have a relatively high computational complexity since they require at least 10 modular multiplications of 512-bit numbers. The main contribution of the present invention is a novel method and apparatus which enables the construction of a truly practical zero knowledge proof technique which requires few interactions, a small number of communicated bits, simple 8-bit arithmetic operations, and compact public and private keys.

Accordingly, the principal object of the present invention is the provision of a new method and apparatus that will make zero knowledge identification schemes more practical and more effective than heretofore possible.

III. BRIEF DESCRIPTION OF THE DRAWINGS

Other and further objects and advantages of the present invention will be apparent from the foregoing and the following detailed description of a preferred embodiment and variants thereof when taken in conjunction with the drawing in which:

FIG. 1 is a block diagram showing how the method and apparatus of the present invention implement the new zero knowledge identification scheme.

Referring now to the drawing, a preferred embodiment of the present invention will be described. Each user has a smart card including an I/O, CPU and memory.

When a user desires to communicate with another user or a central entity appropriately equipped (what is called herein a "verifier"), for the purpose of proving his identity, the user-prover must have already selected his/her/its secret key which is a random permutation $\pi$ and selected a public key, which is a number p, a matrix A, and a vector V such that $V_{90} \in K(A)$. This is shown in FIG. 1 in box 20. To initiate the identification scheme, the user-prover chooses or selects a random vector R and a random permutation $\sigma$, box 26, and computes and sends the cryptographically hashed values of the pairs $(\sigma, AR)$ and $(\pi\sigma, R_\sigma)$, box 30, to the verifier. The verifier receives them in box 32, chooses a random value $0 \leq c < p$ and asks the prover to send $W = R_{94} + cV_{\pi\sigma}$, box 36. The user-prover, in response, computes W and sends to the verifier, who requests prover to reveal $\sigma$ or $\pi\sigma$, box 40. The prover receives the request and either sends $\sigma$ or $\pi\sigma$, box 46 as requested. In the first case, the verifier checks that $(\sigma, A_\sigma W)$ hashes to the first given value, and in the second case the verifier checks that $(\pi\sigma, W - cV_{\pi\sigma})$ hashes to the second given value, box 50. The verifier accepts claim if the test is successful, box 52.

An honest prover who knows $\pi$ will always pass this test, since $A_\sigma W = A_\sigma(R_\sigma + cV_{\pi\sigma}) = A(R + cV_\pi) = AR + cAV_\pi = AR$ and $W - cV_{\pi\sigma} = R_\sigma$ by definition. When a dishonest prover tries to choose the committed values, hashed values of the stated pairs, he should be prepared to answer 2p possible questions. If he can answer correctly p+2 questions when p is prime, then for the same committed $(\sigma, X)$ and $(T, Y)$, there are at least two distinct values $c'c''$ whose response vectors $W'W''$ satisfy both conditions. This leads to the following system of equations:

$A_\sigma W' = X$
$A_\sigma W'' = X$
$W' - c'V_T = Y$
$W'' - c''V_T = Y$

This implies that $(W' - W'') \in K(A_\sigma)$ and $(W' - W'') = (c' - c'')V_T$. Since $c' - c'' \neq 0$, $V_T \sigma^{-1} \in K(A)$ and thus the secret permutation $\pi = \tau\sigma^{-1}$ can be extracted from any p+2 correct answers. Consequently, the probability of success when such an $\pi$ is not known is at most (p+1)/2p. Since this value is essentially ½, only 20 iterations are required to reduce the probability of cheating below the practical security threshold of 1/1,000,000 for each misrepresentation attempt.

The apparatus used to carry out the method of the invention is conventional computing equipment specially programmed as taught herein, and will be known to those skilled in the art.

The practice of the present invention can become conceptually simpler by restricting c to 0 or 1. However, this increases the cheater's probability of success to ¾ per iteration, and more than doubles the number of iterations required to reach the desired security threshold. The (p+1)/2p probability of cheating for the embodiment described is actually achievable, and thus the bound is tight.

The technical proof that the scheme can be carried out with zero knowledge is intuitively very simple: The randomness of R makes the vectors W, AR and $R_\sigma$ completely random, and the randomness of $\sigma$ makes the permutation $\sigma\pi$ completely random. The individual messages sent by the prover convey no knowledge, and it is only the prover's willingness to answer both questions for all the possible c's which convinces the verifier that the prover is genuine.

The minimum recommended size of n should be at least 32 for low security applications and at least 64 for high security applications. For these n the number of permutations $\pi$ ranges between $32! = 2^{120}$ and $64! = 2^{296}$, while the fastest attacks appear to require between $2^{32} \cdot 16! = 2^{76}$ and $2^{64} \cdot 32! = 2^{184}$ steps. The prime p should not be too small (since multiple occurrences of values in V (mod p) reduce its number of distinct permutations), and should not be too large (since multiprecision arithmetic is slow). The best choice of p for 8-bit microprocessors seems to be $p = 2^8 - 5 = 251$. The choice of m should be based on the approximate equation $p^m \approx n!$, which describes the combination of parameters at which a randomly chosen instance of PKP is likely to have a unique solution ($p^m > n!$ implies that some of the m rows of A can be discarded without adding spurious PKP solutions, while $p^m < n!$ implies that some of the entries in $\pi$ can be arbitrarily fixed without losing all the PKP solutions). For $p = 251$ and $n = 32$, m should be approximately 16, and for $p = 251$ and $n = 64$, m should be approximately 37.

The matrix A should be randomly chosen. Its rank will almost certainly be m, and thus the size of K(A) will almost certainly be $p^{n-m}$ (which varies between $2^{128}$ and $2^{216}$ for the choice of parameters discussed above). Without loss of generality, one can assume that A is given in the block form $A = [A' | I]$ where A' is a random $m \times (n-m)$ matrix and I is the $m \times m$ identity matrix, since both users and opponents can apply Gauss elimination to the published A without changing its kernel. Calculating AR (or $A_\sigma W$) is particularly easy in this representation, since $AR = A'R' + R''$ where R' and R'' are the first n−m and the last m entries in R, respectively.

To demonstrate the actual time complexity of the new zero knowledge proofs of identity, consider the concrete case of a $16 \times 32$ matrix A represented as $[A' | I]$ and $p = 251$. The application of permutations and the addition of vectors of size 32 require negligible amounts of time. In addition, the prover performs one matrix-vector multiplication per iteration, and the verifier performs one matrix-vector multiplication every two iterations (on the average). The simplified $16 \times 16$ matrix-vector multiplications require 256 single-byte multiplications, which can be carried out in a few milliseconds on today's microprocessors. This compares very favorably with number-theoretic schemes, in which the calculation of the product of two 512-bit numbers requires 4096 single-byte multiplications (in addition to the overhead caused by the carry propagation and the modular reduction in multiprecision arithmetic).

For the same choice of parameters, the communication complexity of the protocol can be determined. Each vector contains 256 bits, each permutation over $\{1, 2, \ldots, 32\}$ can be described in about 120 bits, and each cryptographically hashed value requires about 64 bits. Since two hashed values, one vector and one permutation, are sent in each iteration, the total communication is about 500 bits per round, which is smaller than the number of bits used in one round of the Fiat-Shamir scheme.

Another advantage of the new scheme (which is particularly important in smart card applications) is that it needs very little memory: The public key V of each user can be stored in 256 bits, and the secret key $\pi$ can be stored in 120 bits. The universal matrix A' can be stored as a pseudo random function of i and j, rather than as an explicit matrix. Since most A' are usable, fairly simple pseudo random functions can suffice in practice. The elements of A' can be generated upon demand (in the original or permuted order) by invoking this function with appropriate arguments, and thus the calculation of the matrix-vector product needs only a few bytes of working space.

The present invention can be extended or modified in a variety of ways. The underlying field $Z_p$ of integers modulo the prime p can be replaced by any ring structure. In particular, one can use the ring $Z_{2^k}$ to replace the modular reductions by truncations. However, this variant enables the opponent to attack the linear equations with the intermediate moduli $2, 4, 8, \ldots, 2^{k-1}$, which may degrade its security.

The permutations $\pi$ and $\sigma$ can be chosen from any publicly known subgroup, and in particular the subgroup that stabilizes certain blocks in $\{1, 2, \ldots n\}$.

The homogeneous linear equations $\Sigma a_{ij} v_{\pi(j)} = 0$ (mod p) can be replaced by the non-homogeneous equations $\Sigma a_{ij} v_{\pi(j)} = u_i$ (mod p), in which $U = (u_1, \ldots, u_m)$ is a given vector. However, these equations can be made homogeneous by adding the vector U as the last column of A, adding $-1$ as the last entry of V, and restricting the permutations to the subgroup that stabilizes the last entry in V. As a result, this extension can actually be viewed as a special case of the basic homogeneous scheme.

The vector U in the non-homogeneous case can also be given in permuted form, so that the problem will be to find two permutations $\pi$ and $\tau$ such that $\Sigma a_{ij} v_{\pi(j)} = u_{\tau(i)}$ (mod p), given A, V and U. This extension can also be viewed as a special case of the basic scheme, by adding -I as an additional block to A, concatenating V and U, and restricting the permutations to the subgroup that stabilizes the first n and the last m entries in $(v_1, \ldots, v_n, u_1, \ldots, u_m)$.

In the non-homogeneous case, it is possible to make both A and V universal. For the variant described in the second paragraph preceding, each user chooses a random permutation $\pi$ as his secret key, and publishes $U = AV_\pi$ as his public key. For the variant described in the preceding paragraph, each user chooses two random permutations $\pi$ and $\tau$ as his secret key, computes $W = AV_\pi$, and publishes $U = W_{\tau^{-1}}$ as his public key. The main advantage of these variants is that their public key directories are smaller (with 128 instead of 256 bits per user for $n = 32$).

The matrix-vector products in the permuted kernel problem can be replaced by matrix-matrix products or even by higher order tensor-tensor products.

To speed up the computations, provers can demonstrate their simultaneous knowledge of several PKP secrets, or carry out in parallel several iterations of the sequential zero knowledge proofs. Parallel computers can compute the matrix-vector products in logarithmic time, since the problem is in the parallel complexity class NC.

The interactive identification scheme can be turned into a non-interactive signature scheme by using the general technique introduced in Fiat and Shamir (1986), see U.S. Pat. No 4,748,668, herein incorporated by reference. However, PKP-based signatures are much longer than Fiat-Shamir signatures, and their practical significance is unclear.

Although the present invention has been shown and described with respect to specific preferred embodiments and variants thereof, nevertheless, changes and modifications will be apparent which embody the inventive teachings herein. Such are deemed to fall within the purview of the invention as claimed.

What is claimed is:

1. A method for identification of a prover to a verifier comprising the steps of:
   (a) establishing for the prover a secret key consisting of a permutation $\pi$ over $\{1, 2, \ldots n\}$, and a public key consisting of a number p, a $m \times n$ matrix A, and an n-vector A such that $V_\pi \epsilon K(A)$ modulo p;
   (b) sending by the prover to the verifier the cryptographically hashed values of the pairs $(\sigma, AR)$ and $(\pi\sigma, R_\sigma)$ where R is a random vector and $\sigma$ is a random permutation, chosen by the prover:
   (c) sending by the verifier to the prover a randomly chosen value c in $o \leq c < p$;
   (d) determining by the prover and sending to the verifier $W = R_\sigma + cV_{\pi\sigma}$;
   (e) revealing by the prover to the verifier either $\sigma$ or $\pi\sigma$, whichever one is requested by the verifier;
   (f) determining by the verifier for the case of $\sigma$ having been revealed that $(\sigma, A_\sigma W)$ hashes to the value of the cryptographically hashed pair $(\sigma, AR)$ and for the case of $\pi\sigma$ having been revealed that $(\pi\sigma, W - cV_{\pi\sigma})$ hashes to the value of the cryptographically hashed pair $(\pi\sigma, R_\sigma)$.

2. The method for identification according to claim 1 wherein the sequence of steps (b), (c), (d), (e) and (f) are iterated $t \geq 1$ times, and accepting the prover's claimed identity only when all the t iterations end successfully.

3. The method for identification according to claim 2 wherein the steps (b), (c), (d), (e) and (f) are iterated about twenty times.

4. The method for identification according to claim 2 wherein c is selected from a range smaller than [o.p].

5. The method for identification according to claim 2 wherein n is selected from the range [32, 64].

6. The method for identification according to claim 2 wherein p is a prime number.

7. The method for identification according to claim 2 wherein p is a power of 2.

8. The method for identification according to claim 2 wherein the arithmetic modulo p is replaced by arithmetic operations over an arbitrary ring structure.

9. The method for identification according to claim 2 wherein p is 251.

10. The method for identification according to claim 2 wherein m is a value determined by the approximate equation $p^m \approx n!$.

11. The method for identification according to claim 2 wherein p is 251, n is 32 and m is 16.

12. The method for identification according to claim 2 wherein p is 251, n is 64 and m is 37.

13. The method for identification according to claim 2 wherein the number p and/or the matrix A are universal and common to many users.

14. Apparatus for identification of a prover to a verifier comprising:
   (a) means for establishing for the prover a secret key consisting of a permutation $\pi$ over $\{1, 2, \ldots n\}$, and a public key consisting of a number p, a $m \times n$ matrix A, and an n-vector A such that $V_\pi \epsilon K(A)$ modulo p;
   (b) means for sending by the prover to the verifier the cryptographically hashed values of the pairs $(\pi,$ AR) and ($\pi\sigma$, $R_\sigma$) where R is a random vector and $\sigma$ is a random permutation, chosen by the prover;

(c) means for sending by the verifier to the prover a randomly chosen value c in $0 \leq c < p$.

(d) means for determining by the prover and sending to the verifier $W = R_\sigma + cV_{\pi\sigma}$;

(e) means for revealing by the prover to the verifier either $\sigma$ or $\pi\sigma$, whichever one is requested by the verifier;

(f) means for determining by the verifier for the case of $\sigma$ having been revealed that ($\sigma$, $A_\sigma W$) hashes to the value of the cryptographically hashed pair ($\sigma$, AR) and for the case of $\pi\sigma$ having been revealed that ($\pi\sigma$, $W - cV_{\pi\sigma}$) hashes to the value of the cryptographically hashed pair ($\pi\sigma$, $R_\sigma$).

15. Apparatus for identification according to claim 14 wherein the sequence of steps (b), (c), (d), (e) and (f) are iterated $t \geq 1$ times, and accepting the prover's claimed identity only when all the t iterations end successfully.

16. Apparatus for identification according to claim 15 wherein the steps (b), (c), (d), (e) and (f) are iterated about twenty times.

17. Apparatus for identification according to claim 15 wherein c is selected from a range smaller than [o,p].

18. Apparatus for identification according to claim 15 wherein n is selected from the range [32, 64].

19. Apparatus for identification according to claim 15 wherein p is a prime number.

20. Apparatus for identification according to claim 15 wherein p is a power of 2.

21. Apparatus for identification according to claim 15 wherein the arithmetic modulo p is replaced by arithmetic operations over an arbitrary ring structure.

22. Apparatus for identification according to claim 15 wherein p is 251.

23. Apparatus for identification according to claim 15 wherein m is a value determined by the approximate equation $p^m \approx n!$.

24. Apparatus for identification according to claim 15 wherein p is 251, n is 32 and m is 16.

25. Apparatus for identification according to claim 15 wherein p is 251, n is 64 and m is 37.

26. Apparatus for identification according to claim 15 wherein the number p and/or the matrix A are universal and common to many users.

* * * * *